Figure 1:
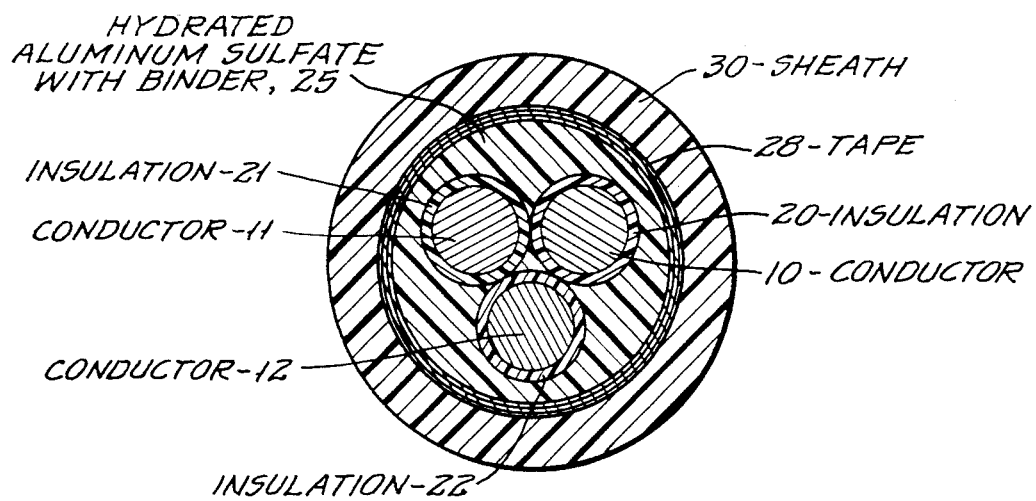

United States Patent [19]

Beretta

[11] Patent Number: 4,600,806
[45] Date of Patent: Jul. 15, 1986

[54] ELECTRIC CABLE WITH COVERING PREVENTING FIRE SPREADING

[75] Inventor: Germano Beretta, Monza, Italy

[73] Assignee: Societa' Cavi Pirelli, S.p.A., Milan, Italy

[21] Appl. No.: 723,090

[22] Filed: Apr. 15, 1985

[30] Foreign Application Priority Data

Apr. 18, 1984 [IT] Italy ................................ 20583 A/84

[51] Int. Cl.$^4$ ................................................ H01B 7/02
[52] U.S. Cl. .............................. 174/121 A; 174/113 R; 174/116; 174/120 SR; 428/921
[58] Field of Search ................ 174/116, 121 A, 113 R, 174/DIG. 1, 120 SR; 428/921; 106/18.23, 18.26; 252/609

[56] References Cited

U.S. PATENT DOCUMENTS 3,571,490 3/1971 Bunish et al. ................... 174/121 A
3,576,388 4/1971 Bruns ......................... 174/121 A X
4,462,831 7/1984 Raevsky et al. ................. 106/18.26

FOREIGN PATENT DOCUMENTS 131792 10/1979 Japan ............................. 174/121 A
1480090 7/1977 United Kingdom .
2059140 4/1981 United Kingdom .

*Primary Examiner*—Arthur T. Grimley
*Assistant Examiner*—Morris H. Nimmo
*Attorney, Agent, or Firm*—Brooks Haidt Haffner & Delahunty

[57] ABSTRACT

An electric cable which is combustion resistant and which prevents the spreading of fire, the cable having insulated conductors and a sheath, the materials of the conductor insulation and the sheath being materials which emit low amounts of toxic gases and smoke when burned. The spaces between the insulated conductors and between such conductors and the sheath are filled with a filler constituted by, the sheath is made from or the sheath is covered with a layer of hydrated aluminum sulfate and a binder of elastomeric or plastomeric material.

6 Claims, 2 Drawing Figures

ELECTRIC CABLE WITH COVERING PREVENTING FIRE SPREADING

The present invention concerns an improved electric cable of the type having the characteristics of preventing the spread of fire without emitting any appreciable toxic gases and smoke.

Cables can be defined as being of the "non fire-spreading" type when, although layed down in groups, they do not spread flames and are also self-extinguishing within a short distance away from the point where the fire starts.

The cable can be of the type used either for the transmission of energy, or of information signals, but preferably, the cable according to the invention is a power cable intended for use in closed environments and where a plurality of cables are disposed with one cable adjacent to the other cable. In situations of this kind, it has been found that even though the cables are well able to resist combustion, they may, nevertheless, still constitute a means of spreading fire until the fire arrives at the more inflammable, or even the most delicate and costly, parts of the plant.

The risks of fire-spreading are even greater where there are duct systems containing layed groups of cables because of the greater concentration of organic material (insulation, fillers, sheaths, etc.), the combustion of which, even though slow, keeps fires burning, especially because of the draft caused by the vertical lengths of the cables and ducts.

Combustion-resistant cables which do not spread fires are known. Such cables rely upon the presence of compounds based on chlorine, sulphur, fluorine etc., which originate gaseous, non-combustible, products. However, cables of this type emit smoke and toxic gases which can prove to be dangerous in closed environments, such as in public rooms, in subways, or in electric power plants. In fact, on one hand, the smoke and gases prove to be dangerous for members of the public who happen to be in the smoke and gas-filled ambient, and the smoke and gases also hamper or obstructs the work of the emergency personnel. For example, a conventional cable in which the insulation contains polyvinyl chloride has a toxicity index on the order of 20 as measured by UTE Standard 20-454 and a conventional cable with polyvinyl chloride-rubber insulation provides a smoke content of 30 mg./cubic meter as measured by the ASTM Standard D-2843-70 using the NBS smoke density chamber of The American Instrument Co.

For this reason, cables have been proposed wherein the emission of toxic smoke and gases are considerably reduced due to the addition of anti-flame and flame-retardant compositions. In British Pat. No. 1,480,090, electric cables are described wherein the insulation of each cable conductor, the outer protective sheath and the filler material, have been selected in such a way that, in case of fire, negligible amounts of gases deriving from acids are originated, and a low amount of smoke is emitted. In particular, the material of the filler is insulating, and it comprises calcium carbonate (in quantities ranging from 60% to 70%) with a limited amount of hydrated aluminum-oxide. In this manner, when the cable is subjected to combustion, a residue of inorganic ash is formed around the insulated conductor or conductors. When such cable was tested in accordance with said Standards, it has a toxicity index slightly higher than unity and provided a smoke content on the order of 5 mg/cubic meter.

A cable of this type is generally satisfactory as far as the emission of toxic gases and smoke is concerned. Nevertheless, it does not solve another problem which is found during the outbreak of fires in closed environments. In fact, in spite of the fact that the cable is combustion-resistant to the extent of retaining its characteristics for a certain time, when exposed to fires and/or high temperatures, it often constitutes a fire transmission means which could propagate the beginnings of a fire to other parts of the plant. The activation temperature of these materials, i.e. when they start to decompose and emit flame-retardant gases, is quite high, and as a consequence, they are unable to counteract, in a desirable way, the development of flames deriving from the organic material of the cable nor the spreading of the flames due to the elastomer present in the filler or in the protective sheath. For example, the cables according to the above-cited British patent have proved to be vulnerable as fire-spreaders in particular situations (vertically disposed groups of cables), or configurations (cables having several conductors and hence, with an abundance of non-metallic material per unit length) since, during the fire-spreading phase, i.e. when the rubber or elastomer that is inevitably present in the cable starts to burn, there is no emission of those gases which, though toxic, are highly flame-retardant.

It must be considered that, given the value of the plants involved and the risk of casualties, the tendency of a cable to behave as a vehicle for transmitting fires, can result as being extremely dangerous and unacceptable. In fact, the risk lies in the fact that any localized and easily controllable fires, can become uncontrollably extended fires (which can cause great harm and injury) because of these cables themselves. On the other hand, the requisite of non-toxicity is necessary in order to provide an efficient safety system which takes into account every possible occurrence and eventuality.

It has now been discovered that it is possible to realize a combustion-resistant cable, of the low emission of toxic gases type, having excellent flame non-propagating characteristics of the same order as those previously found only in cables which emitted toxic gases and smoke. This is obtained with a cable that, apart from being provided with conductor insulation and with a protective sheath which are made from combustion-resistant materials and which emit low amounts of toxic gases and smoke, also has a protective layer of material which is resistant to any spreading of fires, such layer being constituted substantially by an elastomeric or plastomeric binder and by a mass of hydrated aluminum sulfate.

This protective layer can be the filler of a cable or a further layer that is added externally to the sheath, of known cables which have a low emission of toxic smoke and gases. As an alternative, the protective layer can be the layer which forms the outer sheath of the cable.

According to the invention, the electric cable comprising one or more separately insulated conductors disposed inside an insulating sheath of flame resistant material, the sheath and the insulation of each conductor being made of compounds which do not emit any significant acid-derived, gases and smoke in case of fire, is characterized by the fact of having at least one protective layer containing an elastomeric or plastomeric binder which is devoid of halogens, sulphur or nitrogen, and a mass of hydrated aluminum sulfate, the latter constituting from 30% to 80% by weight of the total weight of the protective layer.

Contrary to what is obtained in the known technique, and in particular, in the above-cited British patent, the proposed filler has a high electrical conductivity and hence, it is not utilizable for insulating any conductors. Said combustion-resistant layer can be the layer forming the filler between the insulation of each of the conductors and the outer sheath, or alternatively or in addition, it can be an additional layer applied over the outer sheath of the type of cable or be the outer sheath.

Figure 2:
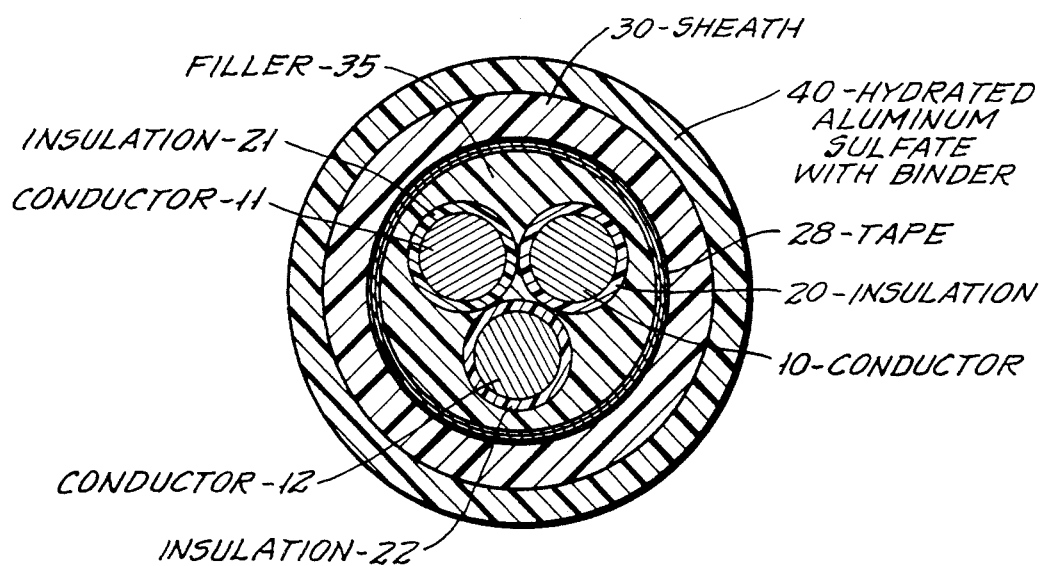

Other objects and advantages of the present invention will be apparent from the following detailed description of the presently preferred embodiments thereof, which description should be considered in conjunction with the accompanying drawings in which:

FIG. 1 is a schematic, transverse cross-sectional view of an embodiment of a cable of the invention; and FIG. 2 is a schematic, transverse cross-sectional view of another embodiment of the cable of the invention.

The cable illustrated in FIG. 1 is formed by three metallic conductors 10, 11 and 12, provided with insulating coverings 20, 21 and 22, respectively, which are contained inside an elastomeric sheath 30. The insulation of the conductors, and of the sheath, are made from compositions which do not generate any significant amount of acid-derived gases and smoke, e.g. insulation of the type described in said British patent.

A filler substance 25, occupies the spaces inbetween the adjacently placed insulated conductors imparting to the assembly constituted by the conductors and the filler 25 a circular outer surface. An enveloping tape 28 of plastic or paper, can be wound helicoidally around the conductors and the filler prior to extruding the sheath 30. The cable can be completed by applying layers of armoring (not shown) around the sheath 30.

According to the first embodiment of the invention, the filler layer 25 comprises an elastomeric or plastomeric binder mixed with hydrated aluminum sulfate. The binder is devoid of any substances which, on burning, can emit toxic smoke and gases, e.g. halogens, sulphur and nitrogen. The weight of the aluminum sulfate is comprised within the range of from 30% to 80% by weight of the total of the layer 25, the balance being substantially the binder.

According to the second embodiment illustrated in FIG. 2, where the identical reference numerals have been used for indicating the corresponding ports, a protective layer 40, which comprises a binder of the previously indicated type which is devoid of substances which produce toxic smoke and gases, and which comprises hydrated aluminum sulfate, is applied outside the sheath 30. The filler layer, indicated with the reference numeral 35, can even contain a certain amount of aluminum sulfate, or else, as an alternative, the filler layer 35 can be of the conventional type, i.e. of such a type that, with combustion, it does not emit any toxic gases or smoke but is without any significant non fire-spreading characteristics.

It is believed that the excellent performance given by the cable of the invention is due to a concurrence of several factors.

About half of the weight of hydrated aluminum sulfate, whose general formula is $Al_2(SO_4)_3.nH_2O$, with n comprised between 14 and 18, is constituted by crystallic water which, when liberated, absorbs considerable quantities of heat, without contributing to the content of toxic gases. Instead, in the previously mentioned cables, the retarding action of the combustion was almost exclusively attributable to the generation of $CO_2$, and possibly CO, from the decomposition of the calcium carbonate, which took place at relatively high temperatures. The generation of these gases choked the flame but with an increase of the content of the harmful gases in the surrounding atmosphere. In the case of the proposed material, the retarding action is due to the absorption of heat on the part of the water that is produced by the decomposition of the material at a much lower temperature (150°–200° C.), and without producing any harmful gases.

Thus, the decomposition of the material starts at a much lower temperature, and typically, with only the presence of the flames which have attacked the cable. Moreover, the action is so effective that, in the absence of other sources of heat (i.e. if just the start of a fire, which tends to spread for the entire cable length is involved), the cable itself is self-extinguishing.

The anhydrous salt, i.e. $Al_2(SO_4)_3$, has a decomposition temperature of about 750° C. Therefore, it starts decomposing, generating a small quantity of gases containing sulphur, only when the cable is enveloped by a fire of vast proportions.

In the light of what has been described hereinabove, it is apparent that part of the hydrated aluminum sulfate could be replaced by another hydrated salt which is capable of providing a comparable contribution to crystallic water.

It must be borne in mind that the sulphur-containing gases produced, even by the decomposition of the anydrous salt, constitute only a part of the combustion products (since, as already stated, the sheath and the insulation are composed of materials which do not generate toxic gases and smoke) and hence, the toxicity index of the gases generated, as a whole, by the cable, even in the midst of widespread fires, is held within permissible limits.

From the several tests to which the cable of the invention have been subjected, the results of one test are set forth hereinafter, such test results being particularly significant because the test was carried out under very severe testing conditions.

A cable was selected that comprised a large number of separately insulated conductors (with a cross-section of $7 \times 1.5$ mm.$^2$),the insulating being constituted by a mixture based on ethylene-propylene rubber vulcanized with peroxide and having a thickness of 1 mm., a filler substance 25 constituted by an ethylene-vinyl-acetate polymer compound containing inert minerals and having a thickness of 0.8 mm. outside the conductors and a sheath formed out of a compound based on thermoplastic polyolefins with a thickness of 1.4 mm. The filler substance 25 was disposed between the insulated conductors and between such conductors and the tape 28.

Some samples of this cable, a few meters long, disposed vertically and spaced apart from one another, and with a quantity of non-metallic material equal to 10 Kg/meter, were ignited with a flame for fifteen minutes. The combustion contined even after the ignition flame was removed, and there was complete burning of the cables after about sixty minutes.

Other samples of cables, constructed in an identical manner with the exception of the filler which, of the same thickness, was formed by 70% by weight of hydrated aluminum-sulfate in an ethyl-vinyl-acetate (EVA) elastomer, were similarly tested, and the flame self-extinguished soon after the igniter was removed.

The maximum height at which signs of cable-burning were observed was 1.85 m., thereby providing that the cable of the invention does not spread fire. Other combustion tests, where the cables of the invention were made to burn completely, resulted in an extremely low generation of toxic gases and smoke without there being any appreciable lowering of the fire-resistant characteristics.

As stated, the protective layer can be added externally to the cable sheath so as to improve the non fire-spreading characteristics of a known type of cable which is already per se fire resistant and which generate small amounts of toxic gases and smoke. If, on one hand, the addition of a further protective outer layer increases the dimensions as well as the cost of the cable, on the other hand, a protection against any fire-spreading is had, such protection being rapid and effective since said protective outer layer is the first to be subjected to the action of the fire. In order to ensure a greater compactness for the covering, it is preferable to have a binder content which is higher with respect to the filler, and more precisely, 40% by weight of EVA, and 60% by weight of hydrated aluminum-sulfate.

Alternately, instead of using a covering 40 over the sheath 30, the sheath 30 itself can contain hydrated aluminum-sulfate in percentages within the ranges set forth hereinbefore.

The invention can also be realized in a form that is different from the examples given. For example, the hydrated aluminum may be partly replaced by alums or with other hydrated salts which are able to introduce into the charge a substantially equivalent water content, or else, by combining the various forms of the invention described in one cable, e.g. an inner filler 25 combined with an outer covering 40.

As used in the claims set forth hereinafter, the expressions "low amounts of acid-derived gases" and "low amounts of smoke" mean, respectively, a toxicity index not greater than about 5 and a smoke content not greater than 15 mg./cubic meter, preferably, not greater than 10 mg./cubic meter, as determined by the Standards identified hereinbefore.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. In an electric cable comprising at least one insulated conductor having a first layer of insulating material around said at least one conductor, and a sheath in the form of a second layer of insulating material around said at least one insulated conductor and a third layer of insulating material around said at least one conductor, the insulating material of said first layer, said second layer and said third layer, when burned, producing only low amounts of acid-derived gases and smoke, wherein the improvement comprises at least one of said second layer and said third layer being formed from a mixture of a plastic binder which is substantially free of halogens, sulfur and nitrogen with hydrated aluminum sulfate, said hydrated aluminum sulfate being present in an amount from about 30% to about 80% by weight of the weight of said one of said second layer and said third layer for resisting the spreading of fire.

2. An electric cable as set forth in claim 1 wherein said hydrated aluminum sulfate is present in an amount from about 30% to about 80% by weight of said one of said second layer and said third layer and the balance of said mixture is substantially all said plastic binder.

3. An electric cable as set forth in claim 1 or 2 wherein said one of said second layer and said third layer is said third layer and is intermediate the insulated conductors and said second layer.

4. An electric cable as set forth in claim 1 or 2 wherein said one of said second layer and said third layer is said third layer and is around said secod layer.

5. An electric cable as set forth in claim 1 or 2 wherein said one of said second layer and said third layer is said second layer.

6. An electric cable as set forth in claim 1 or 2 wherein said electric cable comprises a plurality of insulated conductors each having said first layer of insulating material around the conductor of said plurality of insulated conductors, wherein said second layer of insulating material is around said plurality of insulated conductors, and wherein said third layer is around said plurality of insulated conductors.

* * * * *

UNITED STATES PATENT AND TRADEMARK OFFICE
CERTIFICATE OF CORRECTION

PATENT NO. : 4,600,806
DATED : July 15, 1986
INVENTOR(S) : Beretta

It is certified that error appears in the above-identified patent and that said Letters Patent is hereby corrected as shown below:

Col. 3, line 48, "ports" should read --parts--;

Col. 6, line 11, after "one" insert --insulated--;

Col. 6, line 34, "secod" should read --second--.

Signed and Sealed this

Twenty-first Day of October, 1986

[SEAL]

Attest:

DONALD J. QUIGG

Attesting Officer

Commissioner of Patents and Trademarks